United States Patent
Simonelli

[11] Patent Number: 6,117,318
[45] Date of Patent: Sep. 12, 2000

[54] ROTATING MOTORIZED CONVEYOR PULLEY DRUM HAVING A MAGNETIC PARTICULATE TRAP

[75] Inventor: James K. Simonelli, Sun Prairie, Wis.

[73] Assignee: Emerson Electric Co., St. Louis, Mo.

[21] Appl. No.: 09/187,867

[22] Filed: Nov. 6, 1998

[51] Int. Cl.[7] .............................. B01D 35/06; B03C 1/12
[52] U.S. Cl. .................... 210/222; 210/695; 184/6.25
[58] Field of Search ..................... 210/222–223, 210/695, 783, 784, 396, 400, 403; 198/791, 690.1; 474/92, 142, 91; 184/6.21, 6.24, 6.25, 12; 209/218, 221

[56] References Cited

U.S. PATENT DOCUMENTS

| | | | |
|---|---|---|---|
| 2,459,343 | 1/1949 | Scfrivener | 210/222 |
| 2,541,202 | 2/1951 | Caldwell | 210/222 |
| 2,564,515 | 8/1951 | Vogel. | |
| 2,597,561 | 5/1952 | Blind. | |
| 2,717,080 | 9/1955 | Anderson | 210/222 |
| 3,087,616 | 4/1963 | Pierson. | |
| 3,151,703 | 10/1964 | Benk. | |
| 3,552,565 | 1/1971 | Fritz. | |
| 3,838,044 | 9/1974 | Hengeli. | |
| 3,875,061 | 9/1974 | Palma | 210/223 |
| 4,046,679 | 9/1977 | Scloemann. | |
| 4,051,023 | 9/1977 | Fogle et al.. | |
| 5,066,071 | 11/1991 | Kinser. | |
| 5,078,871 | 1/1992 | McCready | 210/222 |
| 5,383,534 | 1/1995 | Pollier. | |
| 5,556,540 | 9/1996 | Brunsting. | |

*Primary Examiner*—W. L. Walker
*Assistant Examiner*—Marianne S. Ocampo
*Attorney, Agent, or Firm*—Polster, Lieder, Woodruff & Lucchesi, L.C.

[57] ABSTRACT

A motorized conveyer pulley in which an electric motor is enclosed in a rotating cylinder having a cylindrical inner surface has permanently mounted on the inside surface a magnetic material with sufficient surface to attract and retain magnetic particles for the anticipated life of the pulley.

5 Claims, 2 Drawing Sheets

ROTATING MOTORIZED CONVEYOR PULLEY DRUM HAVING A MAGNETIC PARTICULATE TRAP

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

The present invention has particular application to motorized pulleys, in which an electric motor is enclosed in a drum, a rotating cylinder having a cylindrical inner surface. In such pulleys known heretofore, oil contained in the pulley is drained from time to time to remove contamination. In the past, contamination has been of three types; degradation from oxidation, contaminants from external sources, and metallic particles generated internally of the drum. Although the use of synthetic oil has practically eliminated oil oxidation, and sealing the transmission from the external environment practically eliminates external contamination, metallic particles are still generated in the course of the operation of the pulley. Small particles have been carried by the oil when it is drained from the pulley; larger particles were attracted by magnetic drain plugs and came out when the plug is removed during an oil change. Removing the contamination by draining the oil is expensive, due to machine down time, labor, materials, and the proper disposal of oil (i.e. EPA requirements). In internal combustion engines, circulating systems are provided, by which the oil is circulated through a filter to remove contamination. Numerous patents have been directed to providing magnetic assemblies for removing metallic particles that might otherwise bypass the filter. For example, Brunsting U.S. Pat. No. 5,556,540 discusses prior art patents and proposes to improve upon them by inserting within the filter magnetic members, either side by side permanent magnets, or a single sheet of magnetic material. Such assemblies are canisters or cartridges, which are intended to be discarded or reconditioned, and the magnetic member itself is intended to be released from the canister for reuse of the assembly (Column 7, lines 40–44). Providing a pump and circulating system to circulate oil from the pulley through a filter located outside the pulley is not only complicated, likely to lead to damage of the external filter, and expensive but, for the motorized conveyer pulley it is impractical to use this type of system because the pulley drum rotates and the shafts are stationery.

Poilier, U.S. Pat. No. 5,383,534 suggests installing a flexible magnetic member into the drain pan of an internal combustion engine, one end of the flexible member or members being connected to a drain plug so that the flexible members can be pulled from the engine when the plug is withdrawn. Again, the magnetized strip is intended to be withdrawn from time to time, presumably along with the oil in the crankcase.

Kinser, U.S. Pat. No. 5,066,071 discloses a truck wheel bearing hubcap assembly with a "magnetic flag 20" being suspended pivotally from a rod in the center of the hubcap. It is viewable through a transparent window, so that a truck operator can tell when the strip has collected particles, withdraw it, clean it off, and replace it. Oil in the hub is agitated by the motion of the hub itself, but the flag is supposed to remain relatively stationery with respect to the ground, because it is gravity biased, well lubricated and pivotally mounted.

There is a demand for a non-maintenance motorized pulley, in which the oil is not changed for the entire life of the pulley At the same time, as has been indicated, providing a circulating system with an external filter is impractical.

One of the objects of this invention is to provide a magnetic particulate trap that will remove metal particles of any size from the oil in the pulley for the entire anticipated life of the pulley, without changing oil or making any further provision for removal of metallic particles.

Another object is to provide such a device which is inexpensive, readily manufactured, and dependable throughout the anticipated life of the pulley.

Other objects will become apparent to those skilled in the art in the light of the following description and accompanying drawing.

BRIEF SUMMARY OF THE INVENTION

In accordance with this invention, generally stated, in a motorized conveyer pulley in which an electric motor is enclosed in a rotating drum having a cylindrical inner surface, magnetic material is permanently mounted on the inner surface, the magnetic material having sufficient surface and being sufficiently powerful to attract and retain magnetic particles for the anticipated life of the pulley. Preferably, the magnetic material consists of flexible magnetic sheet material, completely lining at least a third, and preferably at least one half, of the available interior surface of the drum, i.e., the surface of that part of the drum in which the oil is contained. When the drum rotates about the fixed shaft or shafts of the motorized conveyer pulley, oil in the drum is drawn in a film over the electric motor and all of the other components that are within the area in which the oil is, giving the magnetic sheet ample opportunity to attract metallic particles in the oil film, and to hold them. Because the sheet rotates with the drum, the metallic particles tend to be distributed fairly evenly through the surface area of the sheet.

It can be seen that the magnetic sheet can extend the full length of the available inner surface of the drum or pulley.

The sheet is adhered to the inner surface of the pulley drum. Its natural resilience also tends to hold it in place. The magnetic sheet can be of the types described in the patents to which reference has been made heretofore. Such material is in common use, almost every refrigerator being adorned with patches of it, although the particular sheet material used herein must be unaffected by oil.

DETAILED DESCRIPTION OF THE INVENTION

Figure 1:
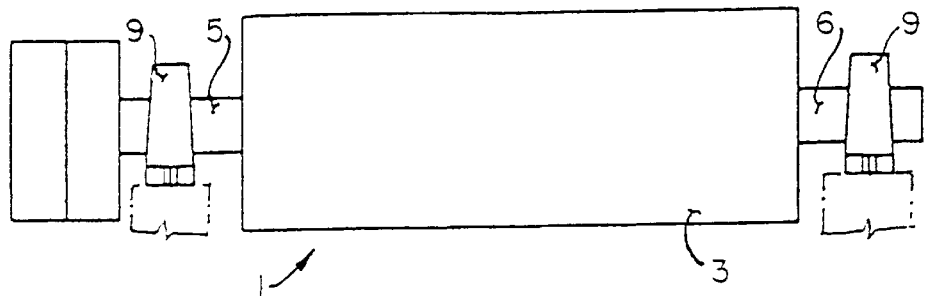
FIG. 1 is a view in side elevation of a typical motorized conveyor pulley.

Referring now to the drawing for one illustrative embodiment of this invention, reference numeral 1 indicates a completed pulley assembly, which includes a drum 3, and end plates 30 and 31 that are bolted to annular endrings secured to and inside the ends of the drum, a solid shaft 5 at a "motor" end of the drum and a hollow shaft 6 at a "gear" end of the drum. The end plates 30 and 31 are rotatably mounted on suitable bearings, on the shafts 5 and 6, respectively. The shafts 5 and 6 have flats 7 on them at their outer ends, which are mounted between complementary faces of yokes 9, by which they are prevented from rotating. A terminal box 11 at the outer end of shaft 6 houses electrical conductors, running through the shaft 6, to a motor 15. The motor 15 has a motor end end shield 23 keyed to the solid shaft 5; a gear end end shield 19, fixedly connected to a gear train housing 26 which is keyed to the hollow shaft 6; a stator housing 21 in which a stator 18 is fixedly mounted, and a rotor 16, which is keyed to a rotating shaft 25 mounted in bearings carried by the end shields 23 and 19. The end shields and stator housing 21 are tied together by throughbolts 24. The rotating shaft 25 carries at its gear end end, a primary pinion 27, which meshes with and drives a primary gear 28, which drives a secondary pinion 29, which meshes with and drives a secondary gear 46, which drives a third stage pinion 47, which meshes with and drives a ring gear 50. The ring gear 50 is bolted to the gear end end plate 31, to drive the drum 3. The various elements of the pulley drum assembly and the bearings and the described elements of the motorized conveyor pulley are, as a general proposition, conventional and, as such, form no part of this invention.

Figure 2:
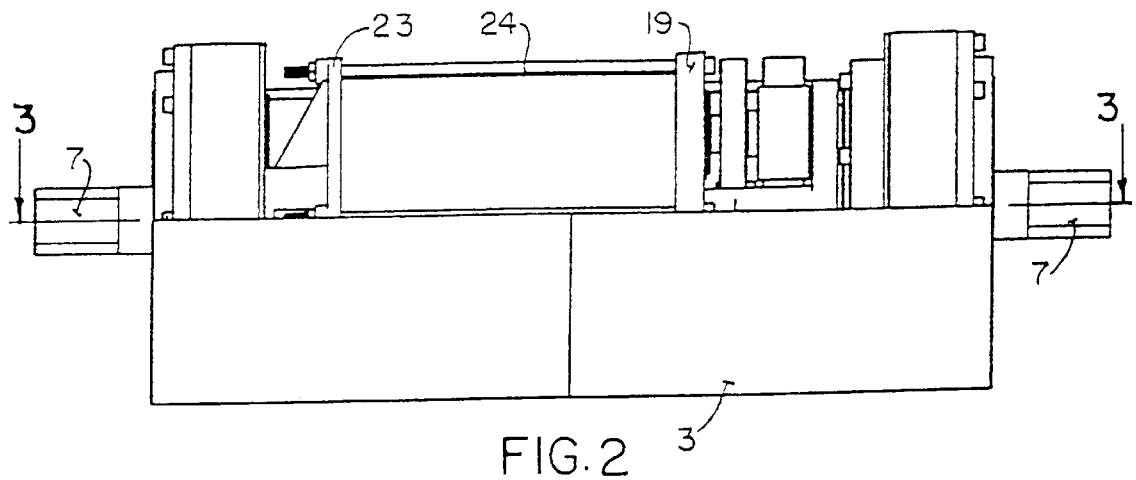
FIG. 2 is a more detailed view in side elevation of a motorized conveyor pulley.
Figure 3:
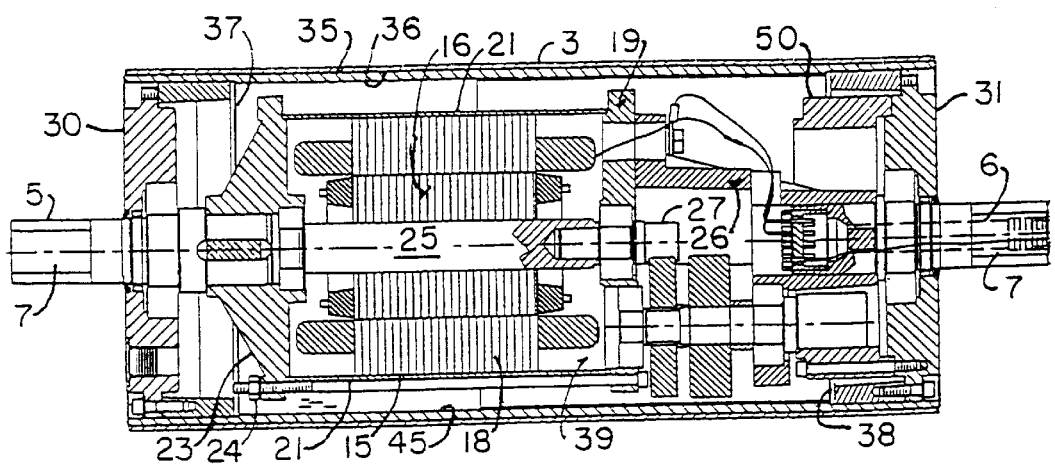
FIG. 3 is a sectional view taken along the line 3—3 of FIG. 2.
Figure 4:
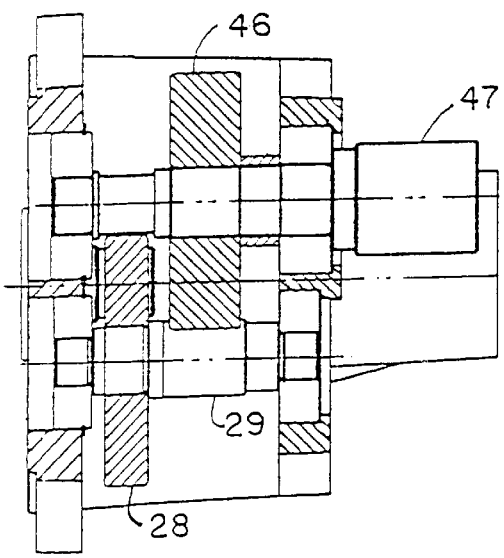
FIG. 4 is an enlarged sectional view of gearing shown in FIG. 3.

The drum 3 has a cylindrical inner wall surface 35. In the embodiment shown, the drum is made in two halves, divided longitudinally, as shown in FIGS. 2 and 4. In this embodiment, a sheet 45 of magnetic material, has an adhesive backing or else can be coated with adhesive, and is mounted on the inner wall surface. As has been indicated, the sheet 45 can be of the magnetic sheet type described in U.S. Pat. Nos. 5,066,071, 5,383,534, and 5,556,540. In any case, suitable magnetic sheet material is commercially available. It is thin enough to permit adequate clearance between it and the stator housing 21. Unlike the filter cartridges, which need to permit a free flow of oil under pressure, the clearance between the sheet 45 and the stator housing 21 need not be great, and the clearance will vary, depending upon the diameter of the drum, because the same sized motor can be used with drums of different diameters, within limits. Oil in the drum is picked up on the inner surface of the sheet as the drum rotates, forming a relatively thin film of oil above the level of the pool of oil in the drum, which pool ordinarily occupies most of the lower half of the drum so as to ensure adequate lubrication of the gears and bearings. As distinguished from the prior art of which applicant is aware, the magnetic material moves relative to the pool of oil, and because the metallic particles tend to settle out, the magnetic material is effective both when the drum is at rest and when it is rotating.

Figure 5:
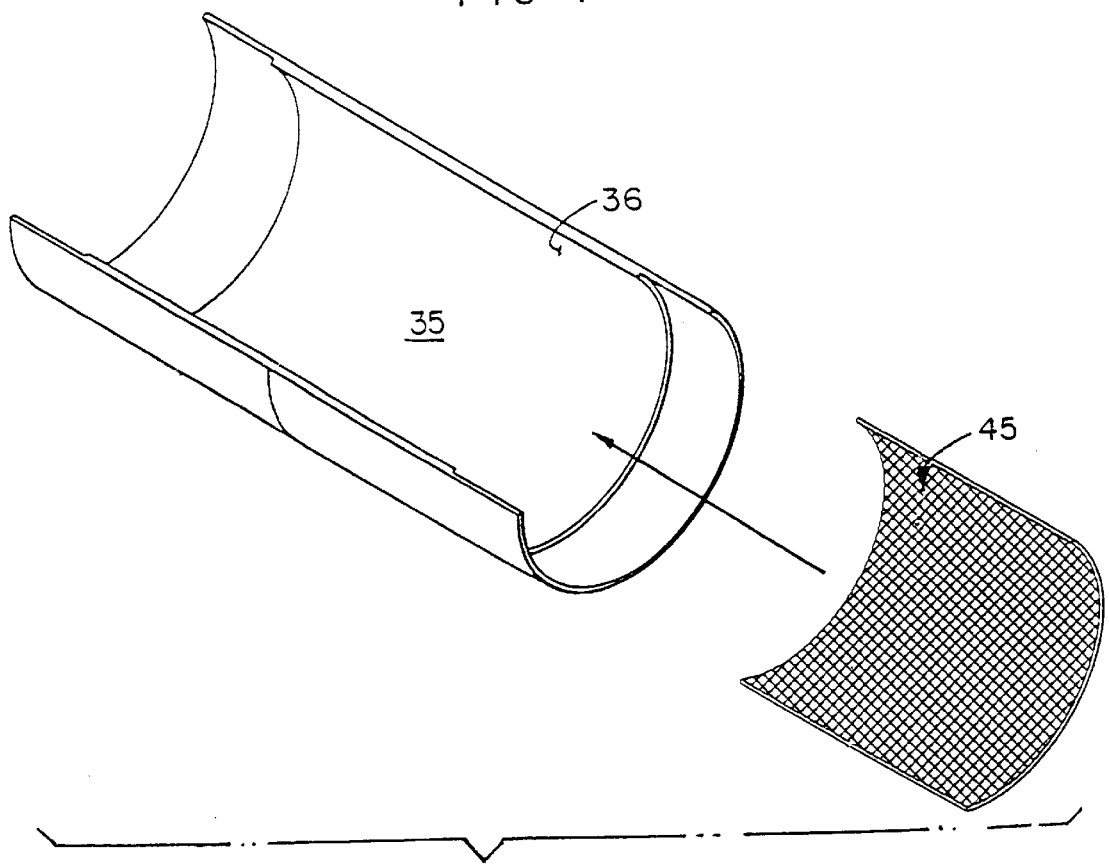
FIG. 5 is an exploded view of half of a pulley drum, with a sheet of magnetic material indicated as being put into place within the drum.

Numerous variations in the apparatus and of the method of its construction within the scope of the appended claims will occur to those skilled in the art in the light of the foregoing disclosure. Merely by way of illustration, as long as they provide sufficient surface to hold all the tramp particles for the expected life of the pulley, thin strips of magnet, either forming a continuous surface, or spaced apart through the length of the interior of the drum, can be employed. If spaced apart, the magnets can be staggered, so as to provide mild agitation to the oil in the pool as the drum rotates. Only enough of the interior of the drum need be provided with magnetic material to satisfy the criterion that it attract and retain the tramp particles during the expected life of the pulley, although extending the magnetic material through the full length of the interior of the drum provides the greatest protection for the bearings and gears. The sheet magnet can be in two pieces, as illustrated in FIG. 5, or in one piece, inserted from an open end before one of the end plates is bolted in place. These are merely illustrative.

What is claimed is:

1. A rotating, substantially horizontally oriented, motorized conveyor pulley drum in which an electric motor is enclosed said drum having a cylindrical inner surface, said drum containing a pool of oil but not being filled with oil, and a flexible sheet of magnetic material mounted on said cylindrical inner surface in direct contact with said oil, said magnetic material having sufficient attraction and surface to attract and retain within said drum throughout the anticipated life of said pulley drum ferrous particles generated within said drum.

2. The pulley drum of claim 1 wherein said flexible sheet of magnetic material is adhered to said cylindrical inner surface.

3. The pulley drum of claim 1 wherein said flexible sheet of magnetic material covers at least one-third of said inner surface.

4. The method of protecting moving elements in a substantially horizontally oriented, rotating conveyor pulley drum with a cylindrical inner surface, said drum containing a pool of oil, but not being filled with oil, into which ferrous particles are introduced in the course of the operation of said drum, comprising securing to said cylindrical inner surface of said drum a flexible sheet of magnetic material for direct contact with said oil, said sheet material having sufficient attraction and sufficient surface to attract and hold said particles, and keeping said sheet of magnetic material and said held particles in place within said drum for the duration of the operating life of said drum.

5. The method of claim 4 wherein said flexible sheet of magnetic material covers at least one-third of said inner surface.

\* \* \* \* \*